United States Patent [19]
Mead

[11] Patent Number: 5,644,363
[45] Date of Patent: Jul. 1, 1997

[54] APPARATUS FOR SUPERIMPOSING VISUAL SUBLIMINAL INSTRUCTIONAL MATERIALS ON A VIDEO SIGNAL

[75] Inventor: Talbert Mead, Colorado Springs, Colo.

[73] Assignee: The Advanced Learning Corp., Colorado Springs, Colo.

[21] Appl. No.: 410,275

[22] Filed: Mar. 24, 1995

[51] Int. Cl.$^6$ .................................................. H04N 5/445
[52] U.S. Cl. .................................. 348/563; 348/473
[58] Field of Search .................................. 348/473, 589, 348/563, 584, 600, 598, 525, 521; H04N 5/445

[56] References Cited

U.S. PATENT DOCUMENTS

| | | |
|---|---|---|
| 3,278,676 | 10/1966 | Becker . |
| 3,742,125 | 6/1973 | Siegel .................................. 348/729 |
| 4,872,054 | 10/1989 | Gray et al. .......................... 348/553 |
| 5,128,765 | 7/1992 | Dingwall et al. ................... 348/729 |
| 5,134,484 | 7/1992 | Willson .............................. 348/564 |
| 5,221,962 | 6/1993 | Backus et al. ..................... 348/563 |
| 5,227,863 | 7/1993 | Bilbrey et al. .................... 348/578 |

*Primary Examiner*—Victor R. Kostak
*Attorney, Agent, or Firm*—Steven K. Barton

[57] ABSTRACT

A subliminal video instructional device comprises circuitry for receiving an underlying video signal and presenting this signal to horizontal and vertical synchronization detection circuits, circuitry for generating a subliminal video message synchronized to the underlying video signal, and circuitry for adding the subliminal video message to the underlying video signal to create a combination video signal.

4 Claims, 4 Drawing Sheets

APPARATUS FOR SUPERIMPOSING VISUAL SUBLIMINAL INSTRUCTIONAL MATERIALS ON A VIDEO SIGNAL

FIELD OF THE INVENTION

This invention relates to a system for generating subliminal instructional messages synchronized to an underlying television signal, and for superimposing these visual, and optionally aural, subliminal messages upon the underlying audiovisual television signal.

BACKGROUND OF THE INVENTION

Subliminal instructional messages are aural, symbolic, or textual messages presented with an often unrelated visual, aural, or audiovisual presentation (hereinafter the underlying video). These messages are presented in such a manner as to not be distracting to the viewer of the underlying video, which is frequently an entertainment oriented presentation. Subliminal messages are intended to be recognized by the viewer's subconscious mind, where they may eventually lead to behavioral modification.

Subliminal messages may be incorporated into a video signal for viewing on a television receiver. This may be done by substituting a frame or field of the video signal with the message, while the majority of fields or frames are those of the underlying video. Subliminal messages may also be presented by weakly modulating a visual characteristic, such as brightness, of the underlying video.

When a subliminal message is presented by weakly modulating a visual characteristic of the underlying video signal, it is important that superimposed subliminal messages be synchronized to the underlying video signal. If the superimposed message's frame and line rates differ greatly from those of the underlying video, the superimposed message may be become so broken up as to be illegible. Should the rates be closer, the message may wander, or roll, about the screen in such a way as to be distracting to the viewer.

Similarly audio subliminal messages can be superimposed upon an audio signal by mixing them with the underlying audio signal. It is, however, advantageous to increase the amplitude of the subliminal audio signal during those periods when the underlying audio signal is loud relative to the amplitude of the subliminal audio signal during those periods when the underlying audio signal is soft.

STATE OF THE ART

Systems for generating video subliminal instructional messages and superimposing them upon an underlying video signal have been described in the art. Most of these are not well suited for mass production at low cost. For example, U.S. Pat. No. 5,027,208 presents a system having a 256 by 256 "substitute frame memory" synchronously superimposed upon a video signal by means of a video mixer. While this 256×256 frame memory offers respectable capabilities for displaying graphic messages as well as textual messages, it also represents 8192 bytes of memory, a substantial chunk compared to the on chip memory of low cost single-chip microprocessors. The device of U.S. Pat. No. 5,027,208 also fails to provide means for on-screen programming of the device.

Similarly, U.S. Pat. No. 5,134,484 presents 18 drawing sheets detailing a method for dynamically decompressing an encoded graphical message. This message is synchronously generated and superimposed on a video signal. While the invention of U.S. Pat. No. 5,134,484 greatly reduces the required memory size for each frame, this comes at a cost of extensive logic not found on even those commercially available microprocessors which support the generating of synchronized video. Further, no provisions are made for on-screen programming or providing control over the modulation intensity of the subliminal messages. While U.S. Pat. No. 5,134,484 describes "additively" combining the subliminal signal in a "combiner," the disclosure is inadequate to determine exactly how the combining function is performed.

U.S. Pat. No. 5,221,962 describes a system that provides a manual video modulation-intensity control so that a user may consciously observe and validate the subliminal message. No on-screen programming of the subliminal message generator is described.

Many low cost control-oriented microprocessors now available include a pulse-width modulator. A pulse-width modulator comprises a few stages of latch and counter, thus inherently costs far less than the resistor-string and R-2R ladder digital to analog converters that are well known in the art. While a pulse width modulated signal may be used to communicate digital information, pulse width modulated signals are often used to drive electromechanical devices. Pulse-driven motor and lamp drivers can be of much higher efficiency than linear analog drivers, while mechanical, visual, or thermal inertia serves to integrate the mechanical impulses provided by the pulse stream.

A common prior-art approach to modulating a color video signal involves the three steps of 1) demodulating the color video signal into the three color signals Red, Green, and Blue; 2) adjusting each of the three color signals as desired; and 3) regenerating a composite video signal from the three adjusted color signals. This prior art technique is expensive in terms of the hardware required. Consider the hardware requirements of step 1 alone, the demodulating of a color signal: generally a phase-locked loop regenerates or picks off the color subcarrier; a crossover filter separates the chroma information from the luminance information; mixers combine the regenerated color subcarrier with the chroma information, producing baseband color difference signals; and finally the difference signals are combined with the luminance information to produce demodulated red, green, and blue signals.

SUMMARY OF THE INVENTION

The present invention comprises a low cost system for generating subliminal visual messages synchronized to a video signal, and superimposing those messages through a programmably variable modulation of brightness of another video signal. The subliminal messages are faded into view gradually so as to avoid distracting a viewer. The invention further comprises a combination video generation hardware that may generate both subliminal visual messages and messages associated with the on-screen programming of the system.

The stronger the modulation of a visual characteristic, or the greater the number of substituted frames, the greater the likelihood that the subliminal message will become distracting to the viewer, at which point the message ceases to be subliminal. Similarly, the weaker the modulation of the visual characteristic the less likely that the subliminal message will be perceived by the subconscious and result in a behavioral modification. It has been discovered that by fading a subliminal message onto the screen gradually, a greater degree of modulation is accepted as non-distracting to the viewer. Such a greater degree of modulation is expected to result in a greater likelihood that the viewer's subconscious will comprehend the message, and undertake a favorable behavioral modification.

The present invention also comprises a low cost method of impressing the subliminal message on the composite video signal.

BRIEF DESCRIPTION OF THE DRAWINGS

The best mode presently contemplated for carrying out the invention is illustrated in the accompanying drawings, in which.

DETAILED DESCRIPTION OF THE INVENTION

Figure 1:
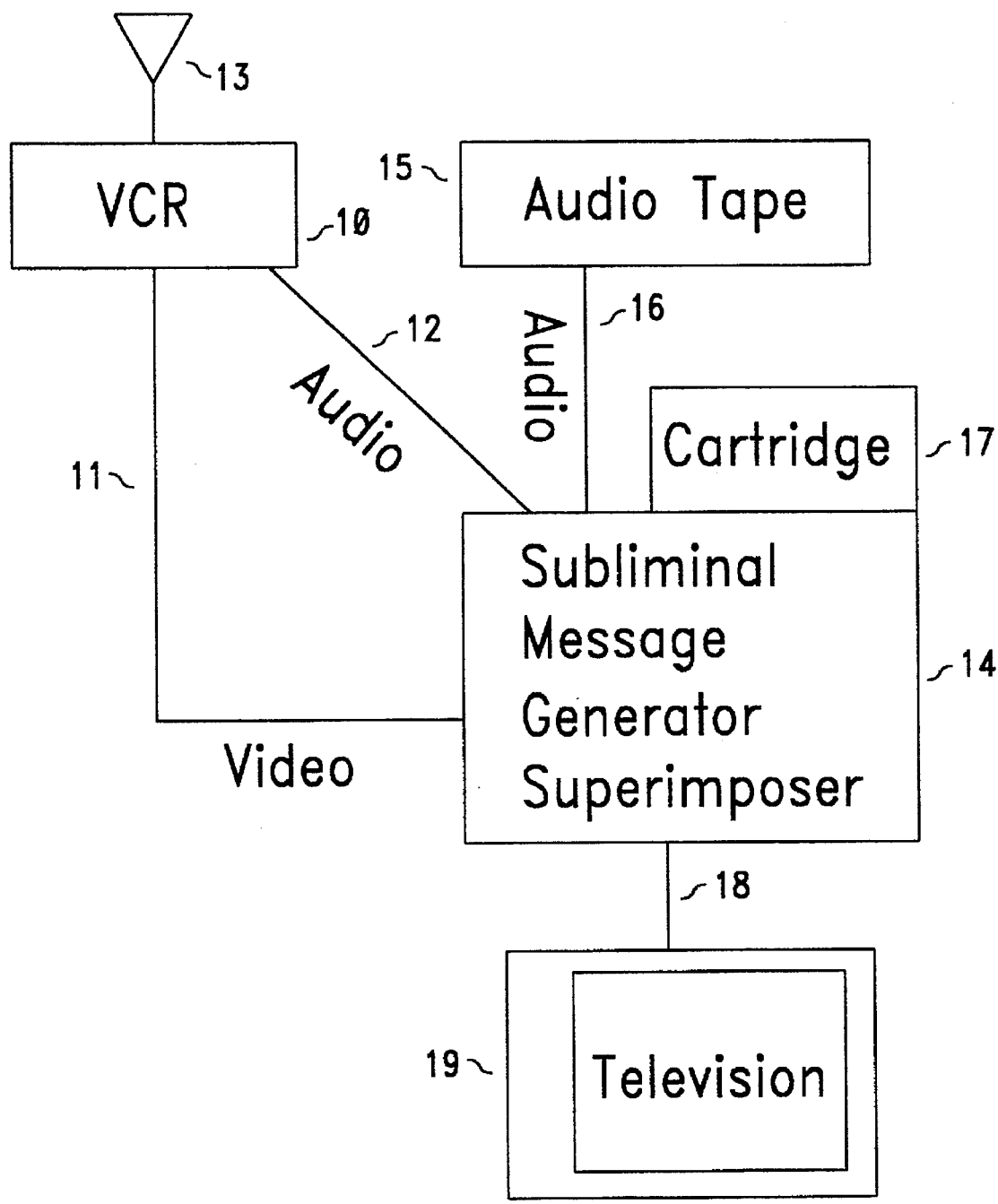
FIG. 1 is a system block diagram wherein the present invention is used to superimpose a subliminal instructional message upon a video signal originating from a videotape recorder and being displayed on a television to a viewer.

In the presently preferred embodiment of the present invention, a videocassette recorder 10 (FIG. 1), is used to provide a source video signal 11 and a source audio signal 12. The videocassette recorder may derive this signal by playing a tape, from an antenna 13 by means of an integral tuner (not shown), from a videogame entertainment device (not shown), or from a cable television signal (not shown). The source video signal 11 and the source audio signal 12 are connected to the subliminal message generator and superimposer 14. The subliminal message generator and superimposer 14 is normally powered by a separate 12-volt D.C power supply (not shown).

An optional audio tape player 15 generates an optional second audio signal 16 which may also feed the subliminal message generator and superimposer 14. This second audio signal will be added to the source audio signal 12 to form either an audio output (not shown) or the audio component of an RF-modulated television signal output 18.

A program selection key cartridge 17 is inserted into the subliminal message generator. This key cartridge 17 contains information about the nature and sequence of the subliminal messages to be displayed; one key cartridge may contain messages such as "Quit Now—Feel Good" for smokers, another may contain messages such as "Exercise More—Feel Good" for viewers with weight problems. The subliminal message generator generates and superimposes subliminal messages upon the video signal from the VCR 10 to form either a video output (32 on FIGS. 2 and 3) or an the video component of an RF-modulated television signal output 18. The audio and video outputs, or the RF-modulated television signal 18, connect to a television receiver 19 (FIG. 1 ) or monitor (not shown) which presents both an underlying source program and the subliminal messages to a viewer (not shown).

Figure 2:
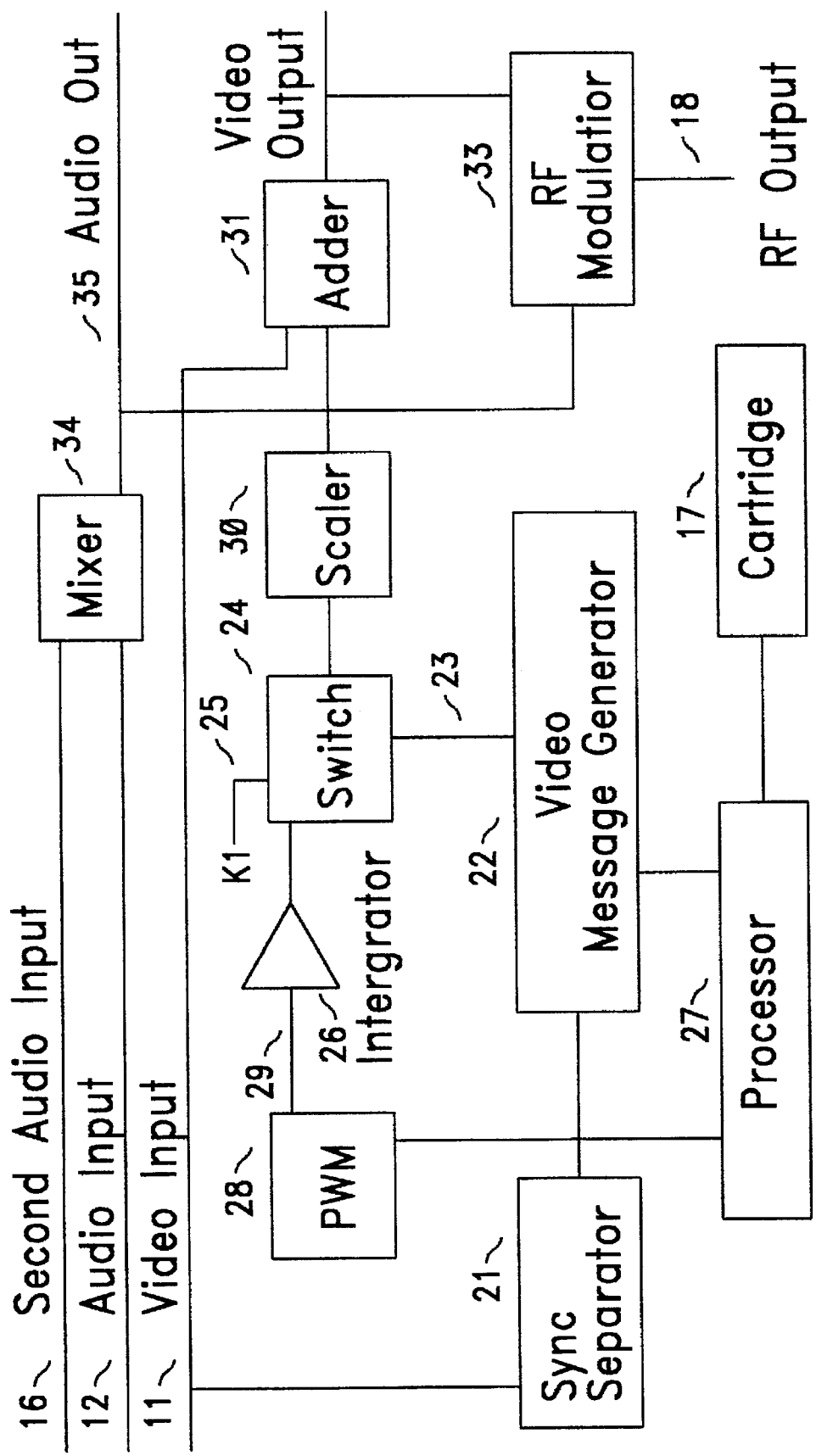
FIG. 2 a block diagram of the subliminal message generator and superimposer of the present invention.
Figure 3:
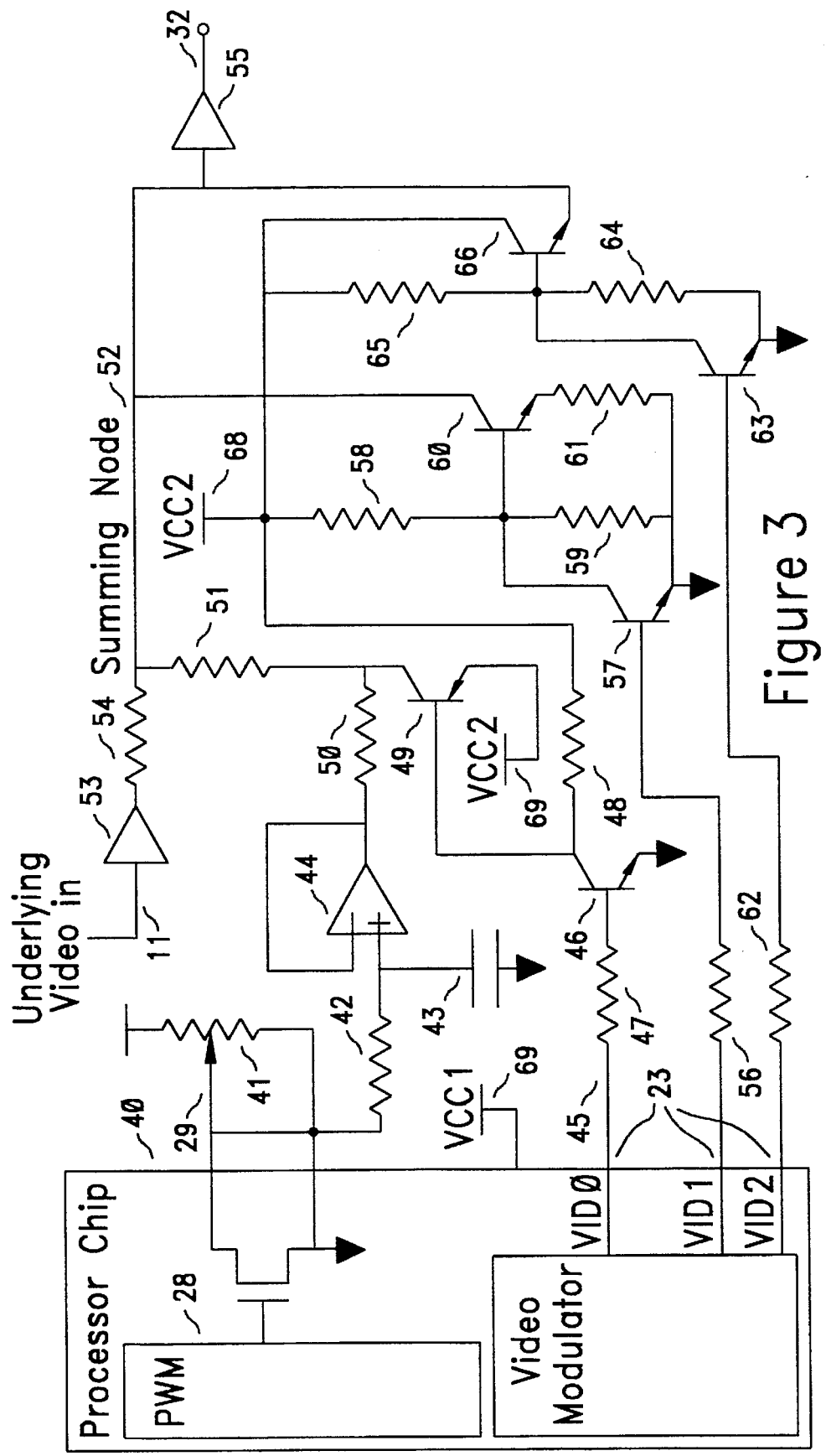
FIG. 3 a circuit diagram of the integrator, switch, scaler, and video adder of the present invention.
Figure 4:
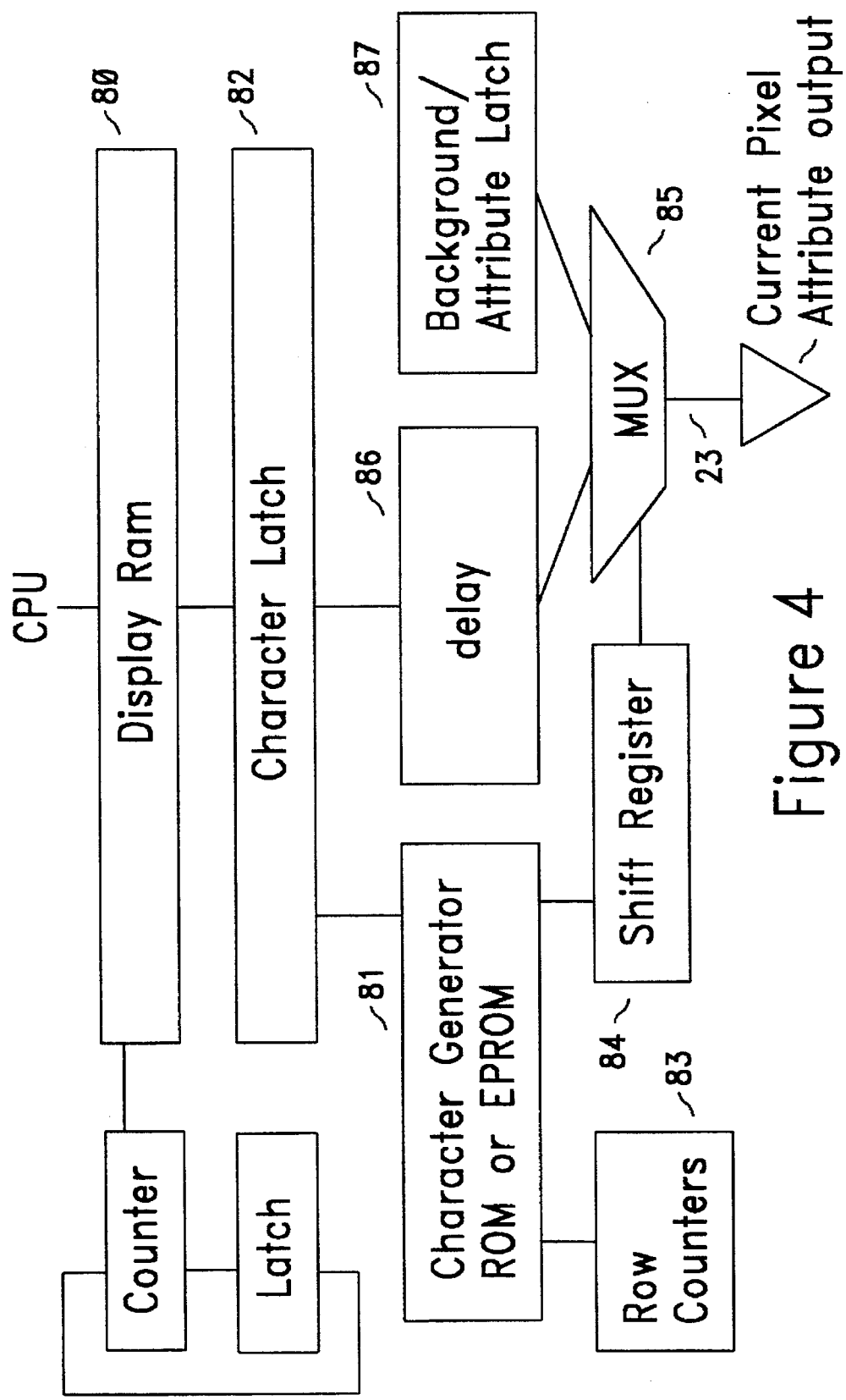
FIG. 4 is, a simplified block diagram of a portion of the 87C055 device used in the present preferred embodiment.

FIG. 2 shows more detail of the subliminal message generator of the present invention. The first video input 11 connects to a synch separator 21 which extracts horizontal and vertical synchronization information from the video signal. This horizontal and vertical synchronization information is used to synchronize a video message generator 22 to the horizontal and vertical scan of the incoming video input signal 11.

The video message generator 22 data output 23 is connected to a control input of a highspeed switch 24. This switch selects either a constant 25 signal or the output of an integrator 26. When the constant 25 is selected the screen intensity of the television 20 will have a first value and when the integrator output is selected the screen intensity will have a second value dependent on the voltage output of the integrator 26. The integrator 26 output is a function of the width of a pulse-width modulated signal 29. A processor 27 drives a pulse-width modulator (PWM) 28 which produces the pulse-width modulated signal 29.

The highspeed switch 24 output is scaled by a scaler 30 and added by an adder 31 to the incoming video signal 11. The output of this adder 31 may be taken as a video output 32 for a monitor, VCR, or other device with a composite video input; or may be fed to an RF modulator 33 to generate a channel 3 or 4 television signal 18. The audio output 12 of the videocassette recorder may be attenuated by an attenuator (not shown) and mixed by a mixer 34 with an optional second audio input 16 to produce an audio output 35. This audio output 35 also serves as an audio input to the RF modulator 33, where the audio information is impressed upon the channel 3 or 4 television signal 18..

The source video signal may comply with the NTSC, SECAM, or PAL standards for composite video. While the presently contemplated initial manufactured version envisions a separately manufactured device for each of these standards, and for each language in which subliminal messages are generated, it is expected that later models of the subliminal message generator will recognize the video standard of the underlying video and automatically configure itself to the appropriate standard. Distinguishing between PAL and NTSC standards may be accomplished through timing the vertical synchronization signal extracted by the synch separator 21; as NTSC video comprises 60 fields per second while PAL comprises 50.

Revisiting the present preferred embodiment of the present invention, the pulse width modulator output 29 is available as an open-drain output of the microprocessor chip 40 (FIG. 3), where a potentiometer 41 is used to pull a logic "1" signal to a desired level. A fixed resistor may be added between this potentiometer 41 and the power supply to prevent destruction of the pulse-width modulator output 29 should the device be turned on with the wiper of potentiometer 41 turned all the way up. This pulse width modulator output is then integrated by a resistor 42 and a capacitor 43, the integral is buffered by an amplifier 44. The output of this amplifier 44 is an analog voltage that corresponds, after delays, to a digital value programmed into the pulse-width modulator 28 by the microprocessor (27 on FIG. 2)

The 87C055 video processor chip used in the presently preferred embodiment has three attribute lines on which the generated video signal 23 appears (FIG. 3), two of which are provided for non-subliminal video displays used during initialization and on-screen user programming of the system. The third of the generated video lines 23, the line on which subliminal video appears 45, is inverted and level shifted by transistor 46, resistor 47, and pull-up resistor 48. The inverted signal controls a switch comprising transistor 49 and resistor 50 which applies the buffered integral to an end of the scaling resistor 51, which feeds the summing node 52. It has been found that 10K is a suitable value for the scaling resistor 51. It has also been found that the circuit will provide an inverted but otherwise suitable superposition of the generated subliminal messages upon the underlying video signal if PNP transistor 49 is substituted with a NPN transistor, the collector-base junction of which acts as a diode to shift down (instead of the normal up) the node between resistors 50 and 51.

The video input signal 11 is buffered by an emitter-follower amplifier 53 and applied through summing resistor 54 to the summing node 52. It has been found that 511 ohms is a suitable value for the summing resistor 54. It is expected that other values may be used for the summing resistors 54 and sealing resistor 51, provided that an approximate resistance ratio of from 1 to 10 through 1 to 50 is maintained. The summed video on the summing node 52 is then buffered by an amplifier 55 to generate the video output signal 32. The operation of summing the incoming video with the switched integrator voltage effectively level shifts the underlying video signal by the subliminal message.

The non-subliminal generated video signals provided for on-screen programming enter the video switch through resistor 62 for light and resistor 56 for dark. Transistors 57 and 60, with resistors 58, 59, and 61, switch a current into summing node 52 when a dark background is desired, and transistors 63 and 66, together with resistors 62, 64, and 65 clamp the summing node 52 to a white level when a white letter or symbol is desired for on-screen programming or initialization displays. It is not necessary that the clamp circuits comprised of transistors 57, 60, 63, 66 and resistors 58, 59, 61, 62, 64, and 65 actually clamp the summing node voltage to a specific value, it is sufficient that they provide sufficient current to overwhelm the input video signal. The hardware of the present invention may be operated to provide dark letters and symbols on a white background, dark letters on an underlying video background, or white letters and symbols on an underlying video background.

The presently preferred embodiment utilizes two power supply voltages. The primary supply, known as VCC2 68, is approximately 10 volts and regulated down from a 12-volt standard wall-cube power supply. The second supply, VCC1 69, is approximately 5 volts as required for the microprocessor.

It has been found that a microprocessor with video message generator of the Phillips 83C053, 83C054, 83C055 and 87C055 family is suitable for use in the present invention. The 87C055 is preferred for prototype and low volume production, while the mask programed 83C055 is preferred for higher volume production. In the present preferred embodiment, a device of this family comprises the processor 27, the pulse-width modulator 28, and the video message generator 22 (FIG. 2). The ROM or EPROM memory of the processor contains suitable software which causes the processor 27 to perform the following functions involved in displaying a subliminal message:

a. Upon power up, the processor 27 must properly initialize the video message generator 22 for the video standard in use (NTSC or PAL are both supported by the 83C054) by the underlying video signal.

b. The system may optionally go through a welcome screen to the user to set maximum modulation levels for the subliminal messages.

c. For each message to be generated, the processor 27 sets the pulse width modulator 28 pulsewidth to zero for minimum modulation intensity.

d. The processor reads the key cartridge 17 (FIG. 2) for information regarding the message to be displayed, and formats this message in the memory of the video message generator 22. While some components of the messages are stored in the cartridge, many components such as words are stored in the ROM or EPROM memory of the processor; the cartridge need then only contain a pointer to each of these message components.

e. The pulsewidth of the pulsewidth modulator 28 is slowly increased until the desired maximum subliminal modulation level is reached. The slow increase in pulsewidth causes the message to fade into view on the television screen without distracting the viewer.

f. The message is allowed to remain on the screen for a given amount of time.

g. The pulsewidth of the pulsewidth modulator 28 is slowly decreased to zero to fade out the subliminal message.

h. Steps c through g repeat for each message to be displayed.

The video generation hardware of the 87C054/87C055 family comprises a 128 character display RAM 80 that contains a message to be displayed and four attribute bits for each character. These attribute bits determine a foreground character attribute code. These attribute codes are referred to as color codes in the 87C054/87C055 documentation. These attribute codes appear during each pixel time as a three bit binary code on the VID0, VID1, and VID2 outputs 23 (FIG. 3), of the device. The video generation hardware further comprises a character generator EPROM or ROM 81 which contains a pixel pattern for up to sixty letters and symbols that may be displayed.

In operation, a display character and foreground attribute is fetched from the display RAM 81 into a character latch 82. This character, together with a current line count within the present character row (from row counter 83), addresses a word in the character generator EPROM or ROM 81. The character generator word is placed in a parallel-load, serial output, shift register 84 and shifted each pixel time to produce a pixel signal. The pixel signal from the shift register is used to create the 3-bit attribute code output on VID0, VID1, and VID2 23 for each pixel of the generated image through selecting in a multiplexor 85 either the foreground attribute in the character latch 82 (which may be delayed 86 to compensate for the character generator cycle time) or a background attribute in a register 87. In the present preferred embodiment, a VID2-VID1-VID0 code of 111 produces unmodified underlying video, a code of 110 produces underlying video as modified for a pixel of a subliminal message, a code of 101 produces a dark pixel for non-subliminal on-screen programming use, and a code of 011 a white pixel for non-subliminal on-screen programming.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. An apparatus for superimposing subliminal and non-subliminal video messages on a video signal to generate a combined video signal comprising:

a. circuitry for receiving a source video signal having horizontal and vertical synchronization information;

b. circuitry for generating sync signals by detecting said horizontal and vertical synchronization information from said video signal;

c. circuitry for generating said subliminal and non-subliminal video messages synchronized to said sync signals;

d. an analog adder for superimposing said subliminal video messages on said source video signal as received by the circuitry for receiving a source video signal, said adder further comprising a clamp circuit for superimposing said non-subliminal video messages on said source signal.

2. An apparatus for superimposing subliminal video messages on a video signal to generate a combined video signal comprising:

(a) circuitry for receiving a source video signal having horizontal and vertical synchronization information;

(b) circuitry for deriving at least one synchronization signal from said horizontal and vertical synchronization information of said video signal;

(c) a pulse width modulator for generating a pulse-width modulated signal;

(d) circuitry for generating a signal comprising said subliminal video messages synchronized to said at least one synchronization signal; and (e) an analog adder for superimposing the subliminal video messages upon said source video signal by shifting a level of the source video signal by a subliminal signal having magnitude proportional to an integral of the pulse-width modulated signal and conveying an image of the subliminal video message signal.

3. The apparatus of claim 2 wherein during the beginning of a period in which a subliminal message is generated, a pulse width of the pulse-width modulator is ramped from a level such that the subliminal message is very weak in the combined video signal, to a level such that the subliminal message is stronger in the combined video signal.

4. The apparatus of claim 3 wherein during the end of a period in which a subliminal message is generated, a pulse width of the pulse-width modulator is ramped from a level such that the subliminal message is present in the combined video signal, to a level such that the subliminal message is weaker in the combined video signal.

* * * * *